(12) United States Patent
Boles

(10) Patent No.: US 11,989,126 B2
(45) Date of Patent: May 21, 2024

(54) TRACKING MEMORY MODIFICATIONS AT CACHE LINE GRANULARITY

(71) Applicant: Micron Technology, Inc., Boise, ID (US)

(72) Inventor: David Boles, Austin, TX (US)

(73) Assignee: Micron Technology, Inc., Boise, ID (US)

(*) Notice: Subject to any disclaimer, the term of this patent is extended or adjusted under 35 U.S.C. 154(b) by 68 days.

(21) Appl. No.: 17/744,332

(22) Filed: May 13, 2022

(65) Prior Publication Data

US 2023/0367712 A1 Nov. 16, 2023

(51) Int. Cl.
*G06F 12/00* (2006.01)
*G06F 3/06* (2006.01)
*G06F 12/0802* (2016.01)

(52) U.S. Cl.
CPC ........ *G06F 12/0802* (2013.01); *G06F 3/0604* (2013.01); *G06F 3/0656* (2013.01); *G06F 3/0679* (2013.01); *G06F 2212/60* (2013.01)

(58) Field of Classification Search
CPC .. G06F 12/0802; G06F 3/0604; G06F 3/0656; G06F 3/0679; G06F 2212/60
See application file for complete search history.

(56) References Cited

U.S. PATENT DOCUMENTS

| 2014/0173186 A1* | 6/2014 | Randall | G06F 12/0866 |
| | | | 711/113 |
| 2017/0097909 A1* | 4/2017 | Simionescu | G06F 3/0656 |
| 2018/0300236 A1* | 10/2018 | Xu | G06F 12/0246 |

* cited by examiner

*Primary Examiner* — Arvind Talukdar
(74) *Attorney, Agent, or Firm* — Lowenstein Sandler LLP

(57) ABSTRACT

Systems, methods, and computer readable media for tracking memory deltas at a cache line granularity. The method includes receiving a base address for a physical memory region, receiving a list of empty log memory buffers associated with a delta logging session, and responsive to determining that a cache line associated with the physical memory region may be in a modified state, storing the modified cache line and metadata associated with the modified cache line in an active log memory buffer referenced by the list of empty log memory buffers. The method also includes determining that the active log memory buffer is full and appending a flag to the active log memory buffer, thereby marking the active log memory buffer as a full log memory buffer. The method also includes storing a list of full log memory buffers, wherein the list is visible to a host processor.

17 Claims, 5 Drawing Sheets

TRACKING MEMORY MODIFICATIONS AT CACHE LINE GRANULARITY

TECHNICAL FIELD

Embodiments of the disclosure relate generally to memory sub-systems, and more specifically, relate to methods for automatically tracking changes to memory at a cache line level while cooperating with a cache coherency protocol of a host system.

BACKGROUND

A dynamic random access memory (DRAM) device includes multiple memory banks grouped in bank groups, e.g., sixteen memory banks grouped into four bank groups. Each memory bank is a memory array that includes a plurality of memory cells, such that each memory cell is capable of storing, depending on the memory cell type, one or more bits of information.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
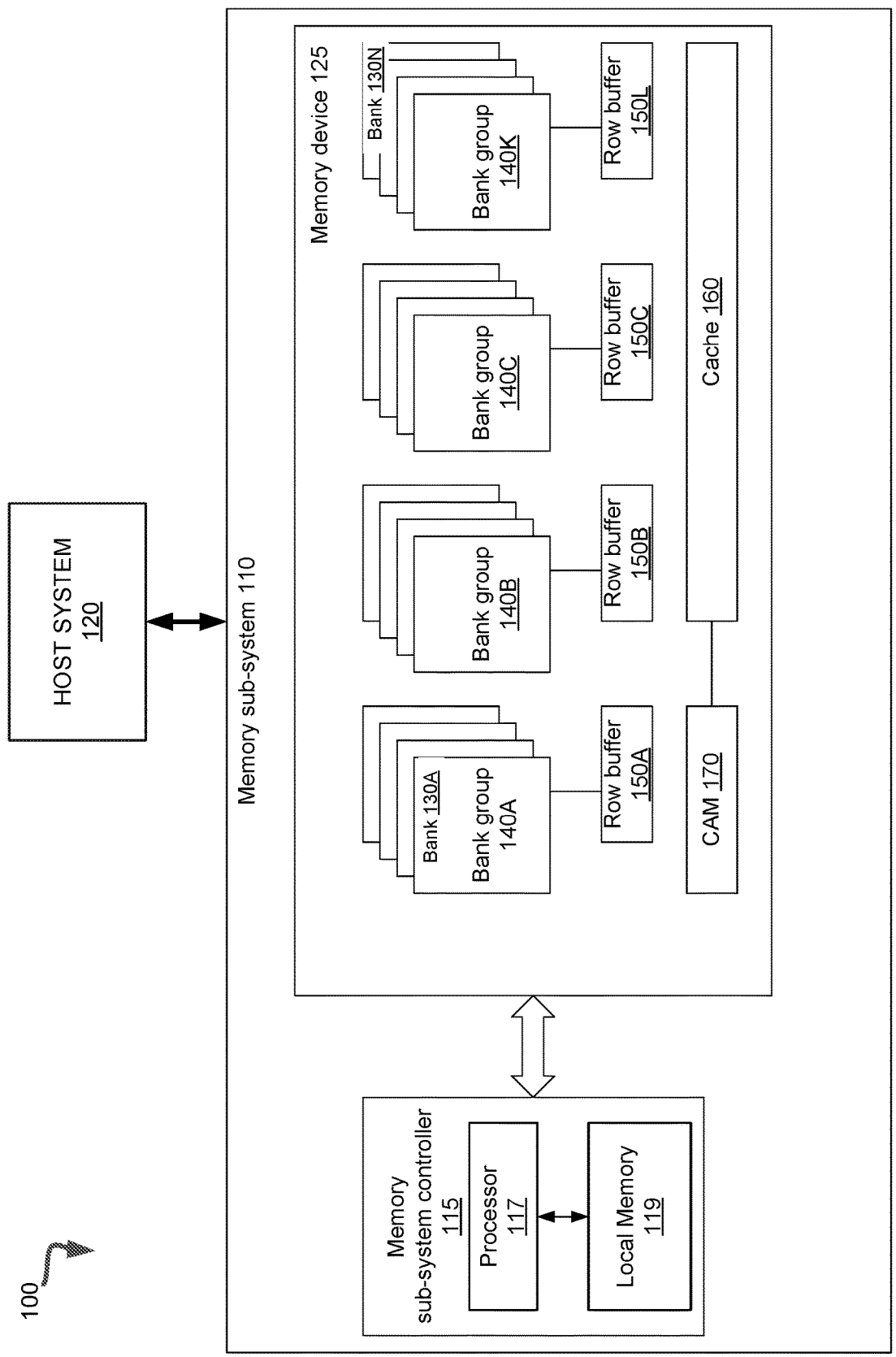
FIG. 1 illustrates an example computing system that includes a memory sub-system in accordance with some embodiments of the present disclosure.

Aspects of the present disclosure are directed to methods and systems for maintaining memory coherency between a host system memory and memory on attached memory sub-systems. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A DRAM device includes multiple memory banks grouped in bank groups, e.g., sixteen memory banks grouped into four bank groups. Each memory bank is a memory array that includes a plurality of memory cells, such that each memory cell is capable of storing, depending on the memory cell type, one or more bits of information. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Memory replication can provide recoverability guarantee for virtual machine instances and databases. This can be by exploiting the virtual-to-physical memory translation mechanisms which track mutations at the granularity of a virtual memory page. The approach of exploiting the virtual-to-physical translation mechanisms, however, can only track mutations at the granularity of a virtual memory page. This unit is typically at least 4 KB.

Memory mutations can be tracked in units of cache lines, typically 64-bytes in size. This coarse page-level granularity creates large space or bandwidth amplification (2-128X) when compared to cache-line level tracking and hinders performance. There are performance advantages to host software using large pages (e.g., 2 MB), however, such page sizes make the space or bandwidth amplification much worse and are effectively unusable for this application. In addition, in some approaches the units of memory deltas are collections of 4 KB pages scattered through memory. This fragmentation reduces the performance of transmitting the data to a remote system over very high performance interconnects.

Aspects of the present disclosure address the above and other deficiencies by creating completely contiguous memory delta logs, allowing maximum performance for replication. For example, systems and methods for automatically tracking changes to memory at a cache line level while cooperating with a cache coherency protocol of a host system are described.

The term "delta" as used in this disclosure refers to a difference, in data or content, between a current state and a previous state of a memory region. More specifically, the term "delta" refers to a difference, in data or content, between a modified state and a state of a cache line prior to the modified state. The term "logging" as used in this disclosure refers to storing or recording of the new content associated with the modified state of the cache line in a memory buffer, or storing, in the memory buffer, an expression of the incremental update from a previous state to a current state of the cache line.

FIG. 1 illustrates an example computing system 100 that includes a memory sub-system 110 in accordance with some embodiments of the present disclosure. The memory sub-system 110 can include media, such as one or more volatile memory devices (e.g., memory device 125). The volatile memory devices (e.g., memory device 125) can be, but are not limited to, random access memory (RAM), such as a dynamic random access memory (DRAM), a synchronous dynamic random access memory (SDRAM), a ferroelectric random access memory (FeRAM), a magnetic random access memory (MRAM), and a resistive random access memory (RRAM).

A memory sub-system 110 can be a storage device, a memory module, or a combination of a storage device and memory module. Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, one or more memory controllers (e.g., NVDIMM controllers), and one or more storage protocol controllers (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a compute express link (CXL) interface, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DEVIM) interface (e.g., DEVIM socket interface that supports Double Data Rate (DDR)), etc. The physical host interface can be used to transmit data between the host system 120 and the memory sub-system 110. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

In some embodiments, the interface between the host system and the memory device can implement one or more alternate protocols supported by another interface standard. For example, the interface can implement one or more alternate protocols supported by PCIe (e.g., non-PCIe protocols). In some embodiments, the interface can be represented by the compute express link (CXL) interface or any communication link that allows cache line granularity updates and shares coherency control with the processing device.

A CXL system is a cache-coherent interconnect for processors, memory expansion, and accelerators. A CXL system maintains memory coherency between the CPU memory space and memory on attached devices, which allows resource sharing for higher performance, reduced software stack complexity, and lower overall system cost.

Generally, CXL is an interface standard that can support a number of protocols that can run on top of PCIe, including a CXL.io protocol, a CXL.mem protocol and a CXL.cache protocol. The CXL.io protocol is a PCIe-like protocol that can viewed as an "enhanced" PCIe protocol capable of carving out managed memory. CXL.io can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures. The CXL.cache protocol can define host-device interactions to enable efficient caching of host memory with low latency using a request and response approach. Traffic (e.g., NVMe traffic) can run through the CXL.io protocol, and the CXL.mem and CXL.cache protocols can share a common link layer and transaction layer. Accordingly, the CXL protocols can be multiplexed and transported via a PCIe physical layer.

A memory sub-system controller 115 (or controller 115 for simplicity) can communicate with the memory devices 125 to perform operations such as reading data, writing data, or erasing data at the memory devices 125 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 125. The memory sub-system controller 115 can further include host interface circuitry to communicate with the host system 120 via the physical host interface. The host interface circuitry can convert the commands received from the host system into command instructions to access the memory device 125 as well as convert responses associated with the memory device 125 into information for the host system 120.

In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 125. The memory device (e.g., DRAM or FeRAM device) 125 includes multiple memory banks 130A-130N, which are grouped in bank groups 140A-140K. While FIG. 1 illustrates sixteen memory banks grouped into four bank groups, various other implementations may employ other numbers of bank groups and banks. Each memory bank 130 is a memory array that includes a plurality of memory cells, such that each memory cell is capable of storing, depending on the memory cell type, one or more bits of information.

As noted herein above, the memory device 125 may further include a set of row buffers 150A-150L, which may be utilized for storing the data retrieved from a row of a bank 130. The memory device may further include an on-die cache 160, which may be utilized for caching portions of the data stored in the main memory banks 130A-130N. In an illustrative example, the data that has been read from a memory bank into a row buffer may be also cached by the on-die cache 160, which thus may be utilized for servicing subsequent memory access requests that are directed to the same row. In some implementations, the cache line size of the on-die cache 160 may match the row buffer size, thus simplifying the cache line allocation schemes that may be employed for managing the cache 160.

Various other components, such as sense amplifiers, input/output interfaces, and command interfaces are omitted from FIG. 1 for clarity and conciseness. In one embodiment, the memory device 125 may be implemented as one or more integrated circuits located on one or more dies. In another embodiment, the memory sub-system 110 may be implemented as a System-on-Chip, which, in addition to the memory device 125 and memory sub-system controller 115 of FIG. 1, may include one or more processing cores and one or more input/output (I/O) interfaces.

In some implementations, management of the cache 160 may be performed by circuitry that is disposed on the memory device 125. Alternatively, management of the cache 160 may be performed by circuitry that is disposed outside of the memory device 125, such as by processor 117. The cache management policy implemented by the memory device 125, by the system-on-chip, or by the host may include caching rules specifying what data should be cached and eviction rules specifying which cache line should be evicted when no cache lines are available to store new data. In some implementations, the baseline caching rule may specify caching any new incoming data. Furthermore, one or more caching rules may implement certain heuristics with respect to which data should be cached (or excluded from caching). Such heuristic rules may specify logical conditions evaluating the data patterns, address ranges, etc. In an illustrative example, a caching rule may specify one or more memory address ranges which should be cached. In another illustrative example, a caching rule may specify one or more memory address ranges which should be excluded from caching. In yet another illustrative example, a caching rule may specify a data pattern such that the incoming data that matches the pattern should be cached. In yet another illustrative example, a caching rule may specify a data pattern such that the incoming data that matches the pattern should be excluded from caching.

The cache management policy may further include one or more eviction rules. In various illustrative examples, an eviction rule may specify the cache line that should be evicted when no cache lines are available to store the new data (e.g., first in first out (FIFO), last in first out (LIFO), least recently used, least frequently used, random replacement, etc.). In some implementations, cache eviction rules may specify logical conditions evaluating the data patterns, address ranges, etc.

As noted herein above, each line of the cache may be associated with cache line metadata specifying the memory address (e.g., the bank group identifier, the memory bank identifier, and the row address), the content of which is currently stored in the cache line. In some implementations, the cache line metadata associated with each line of the cache may further include a cache line status flag indicating whether the cache line may have been modified (to one of a MESIF state (modified, exclusive, shared, invalid, and forward) or a state according to the cache coherency protocol of the host system) since it was copied from the main memory. Accordingly, the data stored in the cache line may only be written back to the main memory if the cache line status flag indicates that the cache line may have been modified since it was copied from the main memory. Conversely, unmodified data in the cache line may be discarded upon the cache line eviction.

In some embodiments, the memory sub-system 110 can be a CXL device supporting CXL protocols. In some embodiments, the memory sub-system controller 115 includes at least a portion of a delta logging component. In some embodiments, the delta logging component is part of the host system 120, an application, or an operating system. Further details with regards to the operations of the delta logging component are described below.

Figure 2:
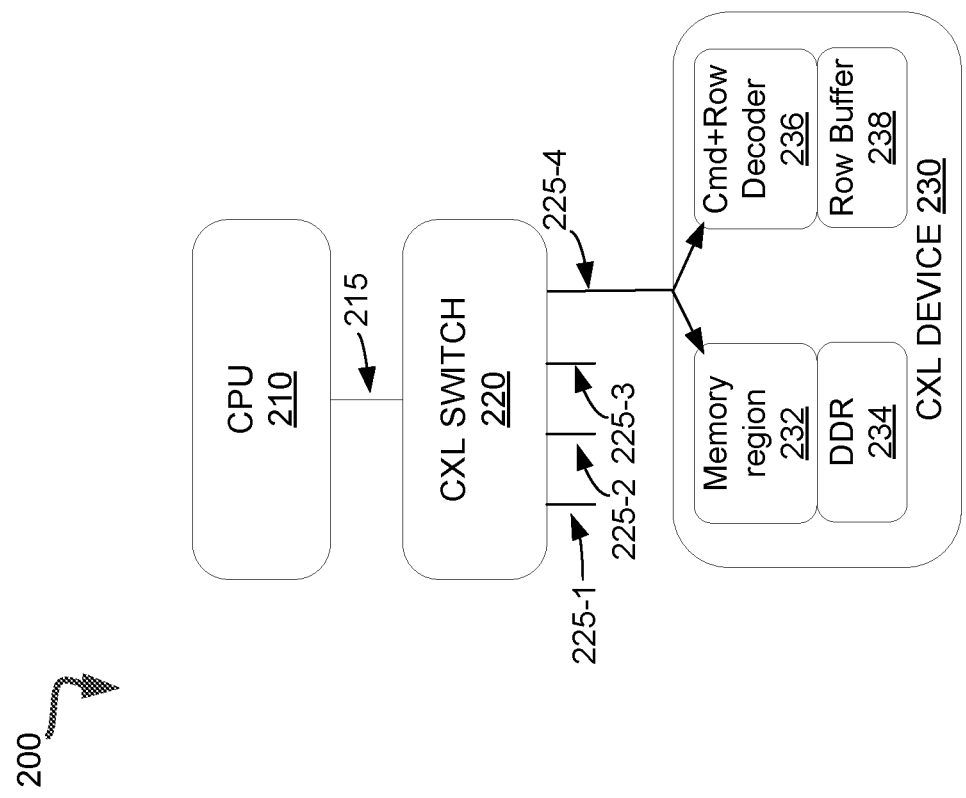
FIG. 2 is a block diagram of an example system including a compute express link (CXL) device in accordance with some embodiments of the present disclosure.

FIG. 2 is a block diagram of an example system 200 including a device enabled with delta logging in accordance with some embodiments of the present disclosure. More specifically, in this illustrative example, the system 200 includes a compute express link (CXL) device 230.

The system 200 can include a central processing unit (CPU) 210. The CPU can correspond to a host system, such as host system 120. The system 200 can optionally include a CXL switch 220 coupled to the CPU component 220 via a CXL connection 215 or a communication link that allows cache line granularity updates and shares coherency control with the processing device. The first CXL connection 215 can include a set of data-transmission lanes ("lanes") for implementing CXL protocols, including CXL.io, CXL.mem, and CXL.cache. The first CXL connection 215 can include any suitable number of lanes in accordance with the embodiments described herein. For example, the first CXL connection 215 can include 16 lanes (i.e., CXL x16).

The system 200 can further include a number of CXL connections 225-1 through 225-4, and a CXL device 230 operatively coupled to the CXL switch via one of the second CXL connections 225-1 through 225-4. In this illustrative example, the CXL device 230 is operatively coupled to the CXL switch 220 via the second CXL connection 225-4. Each of the second CXL connections 225-1 through 225-4 can include a corresponding set of lanes each including any suitable number of lanes in accordance with the embodiments described herein. For example, the second CXL connection 225-4 can include 4 lanes (CXL x4).

In this illustrative example, the CXL device 230 is a dynamic random access memory (DRAM), a synchronous dynamic random access memory (SDRAM), a ferroelectric random access memory (FeRAM), a magnetic random access memory (MRAM), or a resistive random access memory (RRAM) including a number of sub-components. More specifically, the sub-components include a memory region 232, a DDR memory 234 (e.g., memory device 125), a command and row decoder 236, and a row buffer 238.

The CXL device 230 can provide support for at least CXL.io and CXL.mem. More specifically, the memory region 232 can be accessible over CXL.mem and CXL.io.

Using the configuration shown in FIG. 2, the CXL device 230 can include, e.g., PCIe with CXL.io protocol and CXL.mem protocol support. More specifically, the CXL device 230 can allocate a segment of memory for the memory region 232 that will be visible through CXL.mem. For example, the memory region 232 can have a size of 32 MB. However, such a size is purely exemplary. This segment of memory corresponding to the memory region 232 can then be marked as shareable and cacheable.

Figure 3:
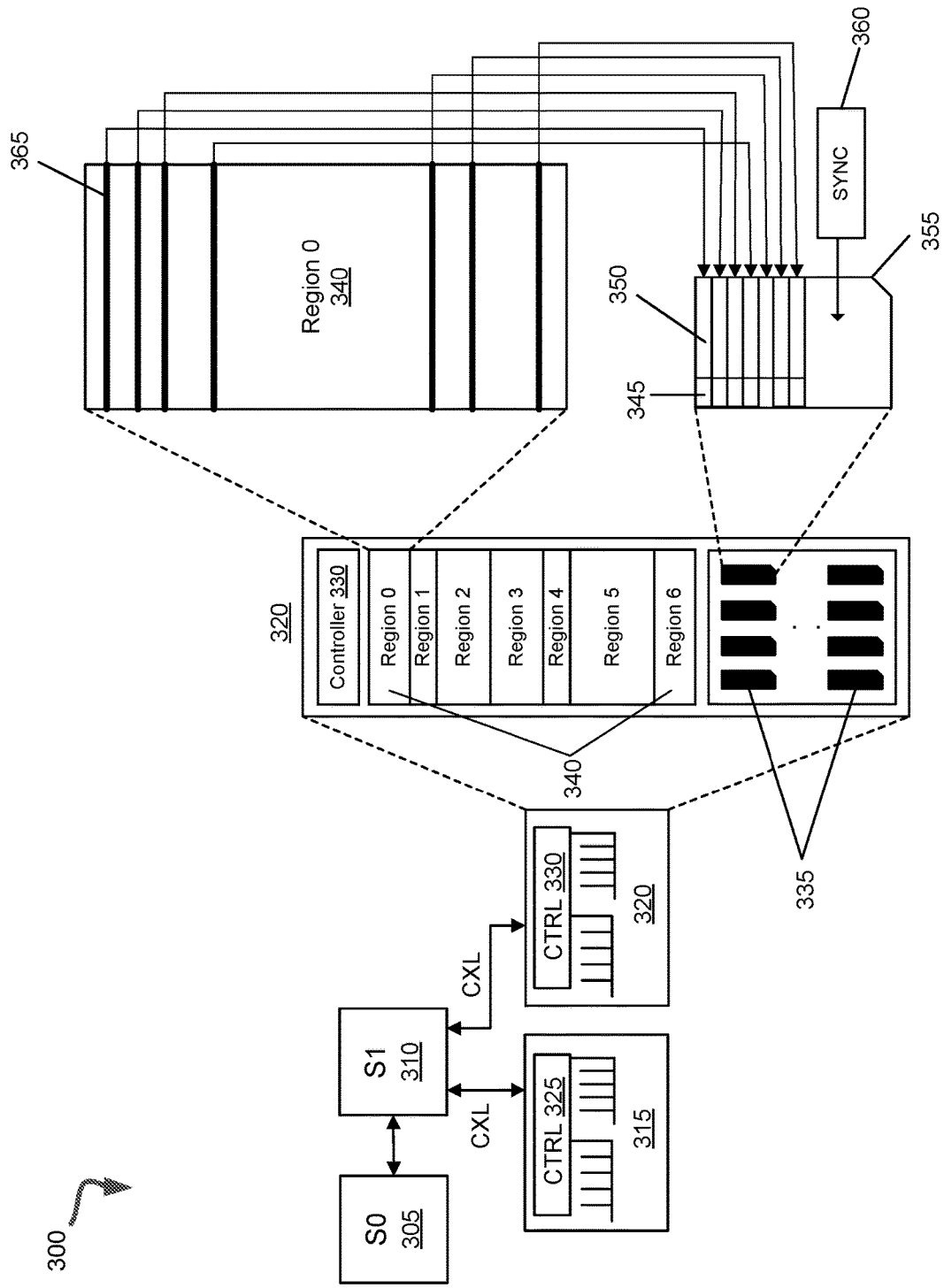
FIG. 3 is a block diagram of an example system for tracking memory deltas at cache line granularity in accordance with some embodiments of the present disclosure.

FIG. 3 is a block diagram of an example system 300 for tracking memory mutations at cache line granularity in accordance with some embodiments of the present disclosure. The term "delta" as used in this disclosure refers to a difference, in data or content, between a current state and a previous state of a memory region. More specifically, the term "delta" refers to a difference, in data or content, between a modified state and a state of a cache line prior to the modified state, according to the MESI or MESIF protocol. The term "logging" as used in this disclosure refers to storing or recording of the new content associated with the modified state of the cache line in a memory buffer, or storing, in the memory buffer, an expression of the incremental update from a previous state to a current state.

A "cache line," as used in this disclosure, may refer to a sequence of memory bytes with a particular alignment and length. In CXL systems, for example, the alignment and length constraints may be 64 bytes. While this term is sometimes used to refer to just the associated sequence of bytes in a processor cache, for purposes of this disclosure, it refers to the actual memory bytes.

A "cache line state," as used in this disclosure, refers to information characterizing the content of the cache line from the cache coherence perspective. A cache line state can be a subset of the system's MESIF (modified, exclusive, shared, invalid, and forward) states and can be reflected by a single Boolean value (e.g., the cache line status flag) indicating whether the cache line may have been modified (to one of a MESIF state or a state according to the cache coherency protocol of the host system) since it was copied from the main memory.

A log memory buffer is a region of memory containing the state information and a sequence of data entries. The state information includes a log memory buffer status flag declaring the buffer as full or not full and a pointer to the "next" memory buffer. The data entries can hold cache line metadata (e.g., the address of the content of the cache line within the memory device) and cache line content as well. For example, the memory device receives a list of empty log memory buffers associated with a delta logging session.

According to one embodiment, a CXL-attached memory device may receive one or more CXL protocol messages from a host processor. The CXL protocol messages include cache line state messages and cache line update messages. The memory device may track the cache line state, for example modified state, for all cache lines it contains. The CXL memory device may also accept non-CXL commands to expose the cache line delta logging functionality.

The MESI protocol is an Invalidate-based cache coherence protocol that supports write-back caches. The letters in the acronym MESI represent four exclusive states that a cache line can be marked with. In the Modified (M) state, the cache line is present only in the current cache, and is dirty, it may have been modified (M state) from the value in main memory. The cache is required to write the data back to main memory at some time in the future, before permitting any other read of the (no longer valid) main memory state. The write-back changes the line to the Shared state(S). In the Exclusive (E) state, the cache line is present only in the current cache, but is clean—it matches main memory. It may be changed to the Shared state at any time, in response to a read request. Alternatively, it may be changed to the Modified state when writing to it. A Shared (S) state indicates that this cache line may be stored in other caches of the machine and is clean, it matches the main memory. The line may be discarded (changed to the Invalid state) at any time. An Invalid (I) state indicates that this cache line is invalid (unused). When the block is marked M (modified) or E (exclusive), the copies of the block in other Caches are marked as I (Invalid).

The MESIF protocol is a cache coherency and memory coherence protocol including five states, Modified (M), Exclusive (E), Shared (S), Invalid (I) and Forward (F). Here, the M, E, S and I states are the same as in the MESI protocol. The F state is a specialized form of the S state, and indicates that a cache should act as a designated responder for any requests for the given line. The protocol ensures that, if any cache holds a line in the S state, at most one (other) cache holds it in the F state. In a system of caches employing the MESIF protocol, a cache line request will be responded to only by the cache holding the line in the F state. This allows the requestor to receive a copy at cache-to-cache speeds, while allowing the use of as few multicast packets as the network topology will allow.

Because a cache may unilaterally discard (invalidate) a line in the S or F states, it is possible that no cache has a copy in the F state, even though copies in the S state exist. In this case, a request for the line is satisfied (less efficiently, but still correctly) from main memory. To minimize the chance of the F line being discarded due to lack of interest, the most recent requestor of a line is assigned the F state, when a cache in the F state responds, it gives up the F state to the new cache.

Thus, one difference from the MESI protocol is that a request for a copy of the cache line for read always enters the cache in the F state. The only way to enter the S state is to satisfy a read request from main memory. There are other techniques for satisfying read requests from shared caches while suppressing redundant replies, but having only a single designated cache response makes it easier to invalidate all copies when necessary to transition to the Exclusive state.

System 300 may include a host complex including one or more host systems S0 (305), S1 (310) connected by an internal bus. Each host system 305, 310 may include one or more processor cores. Each host system 310 may be connected to two or more CXL devices 315, 320 via a CXL interface or any communication link that allows cache line granularity updates and shares coherency control with the processing device. Each of the CXL devices 315, 320 can be, for example, a dual in-line memory module (DIMM) including multiple dynamic random-access memory (DRAM) or ferroelectric random access memory (FeRAM) dies. CXL device 315 may include a memory controller 325 and a plurality of memory regions similar to the memory subsystem controller 115 and memory device 125 illustrated in FIG. 1. Similarly, CXL device 320 may include a memory controller 330 and a plurality of memory regions 340 identified as Region 0-7, for illustrative purposes. The host system 310 has a queue of empty log memory buffers, which can be accessed by the CXL device 320. As cache lines 365 are received in region 340, data 350 from the respective cache lines and metadata 345 associated with the respective cache lines are appended to a current active buffer (CAB) 355. Metadata 345 may include the address of the cache line and a cache line status flag indicating whether a cache line has been modified. For example, if the memory controller 330 receives a new value V for line $A_{0x123abc}$, then the controller 330 records (0x123abc, V) record and its corresponding metadata to the CAB 355. It should be noted, however, that mutations of cache line 365 in region 340 can be received in any order, and they are written into the CAB 355 in the order that they are received. Mutations may occur, for example, as a result of the host system's computation. For example, if the host system were to maintain the total number of objects in a particular cache line, and if the memory device periodically adds and deletes such objects, then the number of objects must be updated in the host system. Consequently, any host processor activity that writes to a memory device that has been configured to performed delta logging may cause the mutation, and as mutated cache lines 365 flow into the memory device, the CAB 355 continues to fill up and when the CAB 355 is full, it is marked as "ready for transmit" and the next empty buffer in the queue becomes the CAB. After all modified cache lines and their respective metadata are appended to the CAB 355, the controller 330 appends a log memory buffer flag to the active log memory buffer, thereby marking the active log memory buffer as a full log memory buffer. In other words, the controller 330 marks CAB 355 as "ready for transmit" and the next empty buffer 335 in the queue becomes the CAB. The controller 330 then maintains (e.g. stores) a queue of full log memory buffers that is visible to the host processor. The host system 310 periodically checks the queue, and if the host system 310 sees a full log memory buffer, the host system 310 removes the full log memory buffer from the queue, processes it or transmits it to another memory device, marks the log memory buffer as empty, and places it on the queue of empty log memory buffers. Therefore, the disclosed mechanism uses a pair of queues for holding log memory buffers for cache line modification records (one queue for empty log memory buffers and one queue for full log memory buffers) allowing software to overlap the generation of the mutation records with the processing of previously generated mutation records.

In one embodiment, the memory device 320 may receive a synchronization request or message from the host system 310. When the memory device 320 receives the synchronization request or message, the controller 330 sends a status request to the host processor and if a cache line has been modified, then the controller 330 invalidates the cache line, and appends the modified content of the cache line along with metadata associated with the cache line to CAB 355. The controller 330 then writes a synchronization record 360 after the last cache line and its corresponding metadata in CAB 355, and appends a log memory buffer flag to the active log memory buffer, thereby marking the CAB 355 as a full log memory buffer. The existence of a synchronization record 360, which may include a time stamp, indicates to the host system 310 that the memory device 320 has a current copy of all cache lines up to that point in time. The controller 330 then maintains (e.g. stores) a list of full log memory buffers that is visible to a host processor.

A delta logging synchronization operation may be performed by the host system 310 either periodically or when a predetermined amount of data has been logged. Delta logging can also be used to implement snapshot logging. For example, a target, such as a host system, may accumulate all changes between two consecutive synchronization points and apply them atomically (e.g. as an elementary (undivided) operation). Alternatively, a source, a memory device, can provide buffer space for an entire incremental snapshot (e.g. an expression of the incremental update from a previous state to a current state) and then transmit it after issuing a synchronization point.

The controller 330 receives a list of empty log memory buffers, which are then filled with data 350 and metadata 345 associated with data 350, and released to the host processor to empty out the filled buffers. The host system 310 transfers the data 350 and metadata 345 from the log memory buffers that are marked as "full" to another memory device, and empties the log memory buffers that are full, to produce an empty buffer.

Figure 4:
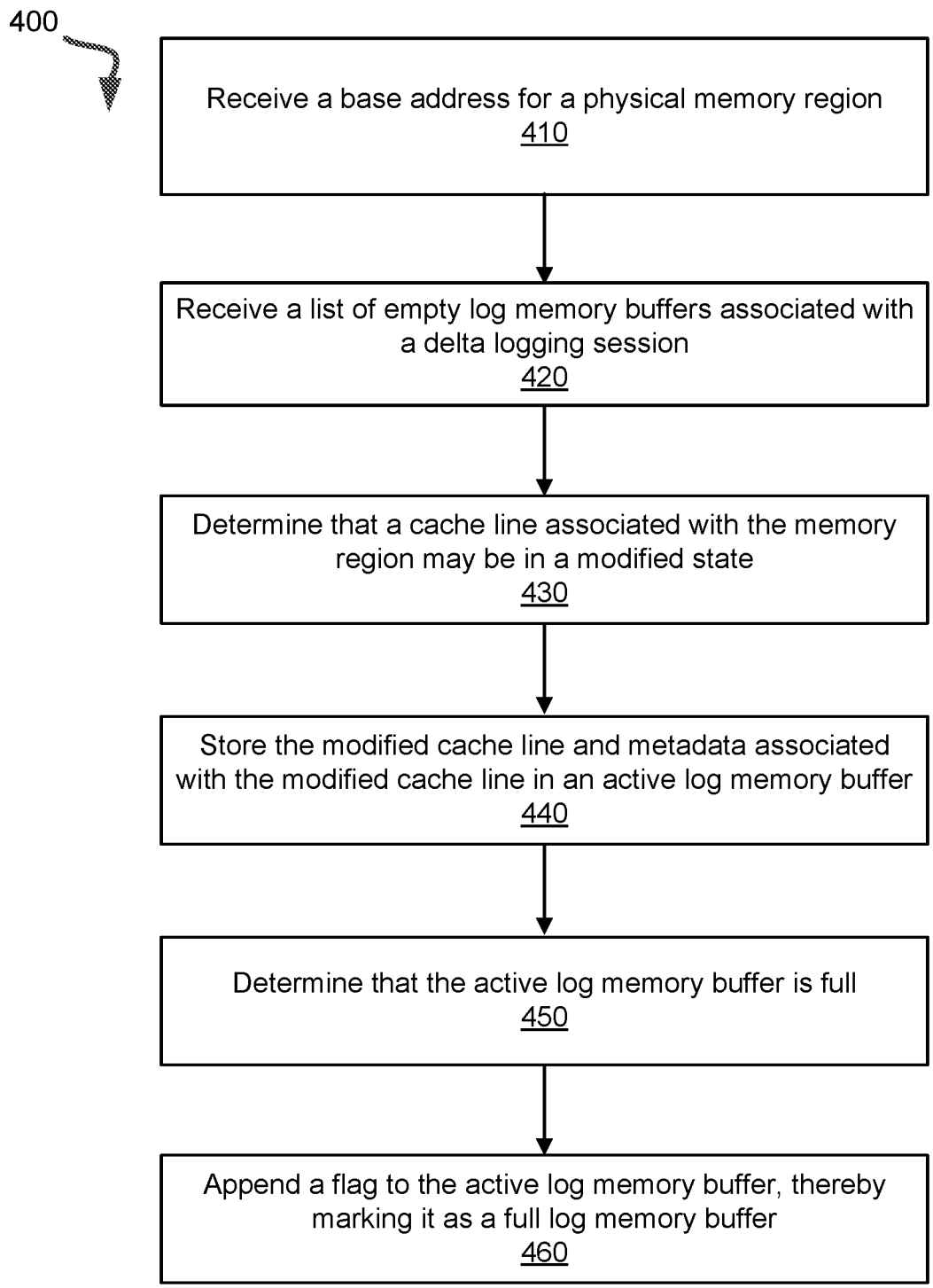
FIG. 4 is a flow diagram of an example method for tracking memory deltas at cache line granularity in accordance with some embodiments of the present disclosure.

FIG. 4 is a flow diagram of an example method 400 for tracking memory deltas with cache line granularity, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by a delta logging component in the memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic of the CXL device (e.g. device 315 or 320 shown in FIG. 3), which may include a dynamic random access memory (DRAM), a synchronous dynamic random access memory (SDRAM), a ferroelectric random access memory (FeRAM), a magnetic random access memory (MRAM), or a resistive random access memory (RRAM), receives a base address for a physical memory region (e.g. 340 shown in FIG. 3) from the host system (e.g. S0 or S1). At operation 420, the processing logic may receive a list of empty log memory buffers (e.g. 335 shown in FIG. 3) associated with a delta logging session. In one embodiment, the processing logic may further receive an initiate message from the host system to initiate the delta logging session. Upon receiving the initiate message, the processing logic may associate a session identifier with the delta logging session for the physical memory region and read a state of one or more cache lines (e.g. cache line 365 shown in FIG. 3) within the physical memory region. At operation 430, the processing logic may, responsive to determining that the cache line associated with the memory region may be in a modified state, store the modified cache line and metadata (e.g. metadata 345 shown in FIG. 3) associated with the modified cache line in an active log memory buffer (e.g. CAB 355 shown in FIG. 3), in operation 440. At operation 450, the processing logic may determine the active log memory buffer is full, and append a log memory buffer flag to the active log memory buffer, thereby marking the active log memory buffer as a full log memory buffer, at operation 460. The processing logic of the memory device places full log memory buffers on a queue that is visible to the host system. The host system periodically checks the queue, and if the host system sees a full log memory buffer, the host system removes the full log memory buffer from the queue, processes it or transmits it to another memory device, marks the log memory buffer as empty, and places it on a queue of empty log memory buffers.

In one embodiment, the processing logic of the memory device may receive a synchronization or "sync" message from the host system. When the memory device receives the "sync" message, the processing logic of the memory device sends a status request to the host processor and if a cache line has been modified, then the processing logic of the memory device invalidates the cache line, and appends the modified content of the cache line along with metadata associated with the cache line to the CAB. The processing logic of the memory device then writes a synchronization record after the last cache line and its corresponding metadata in CAB, and marks the CAB as "ready for transmit." The process then follows operation 460 where the processing logic appends a log memory buffer flag to the active log memory buffer, thereby marking the active log memory buffer as a full log memory buffer. The processing logic then maintains (e.g. stores) a list of full log memory buffers that is visible to a host processor.

In one embodiment, the processing logic may send a status message to the host system. The status message may include a completion status indicating the completion of the delta logging session, and the session identifier. The length of the physical memory region may be in units of one or more pages. In one embodiment, the processing logic may restrict new memory loads to the physical memory region while the delta logging session is in progress, for example, by not allowing any new memory loads to the physical memory region while the delta logging session is in progress.

Advantages of the present disclosure include, but are not limited to, that the space overhead on the primary node is the total size of the queue of the buffers. Second, the immediate appending to CAB and transfer of whole buffers maximizes locality. First propagation of data to safety or another memory device can occur when the CAB becomes full. Additionally, handling of the buffers on primary and secondary nodes can be tailored to application needs. Existing approaches only allow tracking at a virtual memory page granularity. In the case of a 4 KB page size, for example, this results in 64x lower resolution and potential space or bandwidth amplification. In addition, a 4 KB page size places a large burden on the virtual address translation hardware resources and larger page sizes are preferred wherever possible. The next supported page size of most processor architectures is 2 MB which triggers a potential 16384X space or bandwidth amplification. Additionally, the tracking mechanism disclosed here is independent of processor configuration. For example, the tracking mechanism can be used for both virtual machines (VM) and physical memories. Similarly, the tracking mechanism disclosed here (e.g. tracking at a cache line granularity) can be used in managing virtual machines (VM) or containers in a cloud computing environment.

The methodology disclosed here also provides a flexible programming model. For example, the use of a pair of queues for holding containers for cache line modification records (one queue for empty containers and one queue for full containers) allows software to overlap the generation of the mutation records with the processing of previously generated mutation records. This eliminates sudden bursts of such processing allowing for smoother QoS in terms of processing, network, and storage performance. Additionally, the presence of the "sync" command, which allows software to intentionally cause the queue of outstanding cache line modifications to be drained and the end of such processing to be signaled to software allows both continual replication with defined recovery points as well as snapshots.

Figure 5:
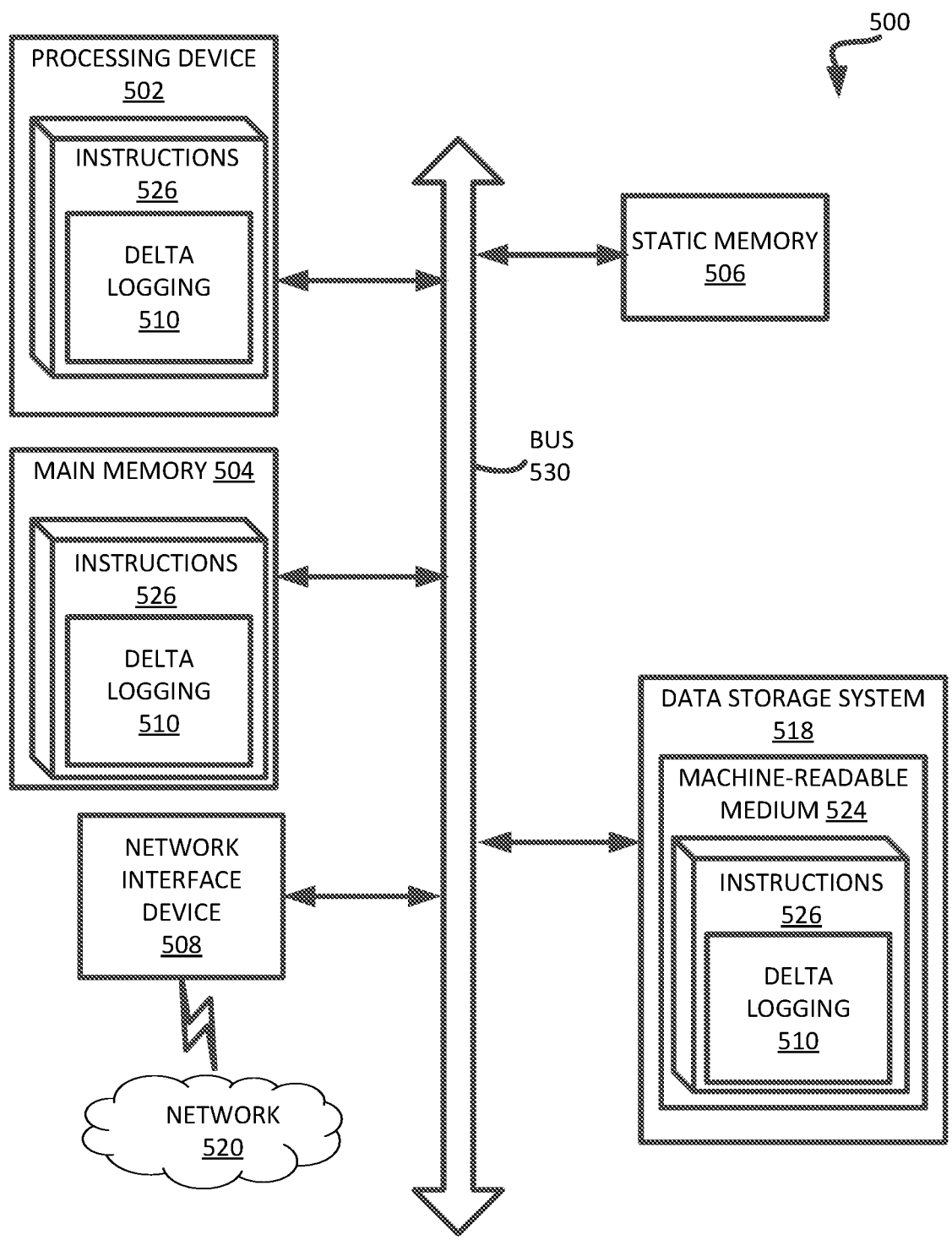
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the delta logging component 510). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a delta logging component 510. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
receiving a base address for a physical memory region;
receiving a list of empty log memory buffers;
responsive to determining that a cache line in the physical memory region is in a modified state, storing the modified cache line and metadata associated with the modified cache line in an active log memory buffer referenced by the list of empty log memory buffers;
determining that the active log memory buffer is full; and
associating a flag with the active log memory buffer, thereby indicating the active log memory buffer as a full log memory buffer; and
sending a status message to a host processor, the status message comprising at least one of a completion status or a session identifier of a logging session.

2. The system of claim 1, wherein the operations further comprise:
receiving a synchronization request from the host processor;
sending a status request to the host processor;
responsive to determining that the cache line is in a modified state, invalidating the cache line;
appending the modified cache line and the metadata associated with the modified cache line to the active log memory buffer; and
associating a synchronization record with the active log memory buffer prior to indicating the active log memory buffer as full log memory buffer.

3. The system of claim 1, wherein the metadata comprises a cache line status flag indicating whether the cache line is in a modified state and a memory address of the modified cache line.

4. The system of claim 1, wherein the operations further comprise:
storing a list of full log memory buffers, wherein the list is visible to the host processor.

5. The system of claim 1, wherein the system comprises a computer express link (CXL) device and wherein the processing device is a memory controller of the CXL device.

6. The system of claim 5, wherein the CXL device comprises one of a dynamic random access memory (DRAM), a synchronous dynamic random access memory (SDRAM), a ferroelectric random access memory (FeRAM), a magnetic random access memory (MRAM), and a resistive random access memory (RRAM).

7. The system of claim 1, wherein the processing device is operatively coupled to the host processor, and an interface between the host processor and the processing device comprises a compute express link (CXL) or a communication link that allows cache line granularity updates and shares coherency control with the processing device.

8. A method comprising:
receiving a base address for a physical memory region;
receiving a list of empty log memory buffers;
responsive to determining that a cache line in the physical memory region is in a modified state, storing the modified cache line and metadata associated with the modified cache line in an active log memory buffer referenced by the list of empty log memory buffers;
determining that the active log memory buffer is full; and
associating a flag with the active log memory buffer, thereby indicating the active log memory buffer as a full log memory buffer; and
sending a status message to a host processor, the status message comprising at least one of a completion status or a session identifier of a logging session.

9. The method of claim 8, further comprising:
receiving a synchronization request;
sending a status request to the host processor;
responsive to determining that the cache line is in a modified state, invalidating the cache line;
appending the modified cache line and the metadata associated with the modified cache line to the active log memory buffer; and
associating a synchronization record with the active log memory buffer prior to indicating the active log memory buffer as full log memory buffer.

10. The method of claim 8, wherein the metadata comprises a cache line status flag indicating whether the cache line is in a modified state and a memory address of the modified cache line.

11. The method of claim 8, further comprising:
storing a list of full log memory buffers, wherein the list is visible to the host processor.

12. A non-transitory computer-readable storage medium comprising instructions that, when executed by a processing device, cause the processing device to perform operations comprising:
receiving a base address for a physical memory region;
receiving a list of empty log memory buffers;
receiving an initiate message to initiate a delta logging session;
associating a session identifier with the delta logging session for the physical memory region;
reading a state of one or more cache lines a cache line within the physical memory region;
responsive to determining that the cache line in the physical memory region is in a modified state, storing the modified cache line and metadata associated with the modified cache line in an active log memory buffer referenced by the list of empty log memory buffers; and
determining that the active log memory buffer is full; and
associating a flag with the active log memory buffer, thereby indicating the active log memory buffer as a full log memory buffer; and
sending a status message to a host processor, the status message comprising at least one of a completion status or a session identifier of a logging session.

13. The non-transitory computer-readable storage medium of claim 12, the operations further comprising:
receiving a synchronization request;
sending a status request;
responsive to determining that the cache line is in a modified state, invalidating the cache line;
appending the modified cache line and the metadata associated with the modified cache line to the active log memory buffer; and
associating a synchronization record with the active log memory buffer prior to indicating the active log memory buffer as full log memory buffer.

14. The non-transitory computer-readable storage medium of claim 12, wherein the metadata comprises a cache line status flag indicating whether the cache line is in a modified state and a memory address of the modified cache line.

15. The non-transitory computer-readable storage medium of claim 12, wherein the operations further comprise:
storing a list of full log memory buffers, wherein the list is visible to the host processor.

16. The non-transitory computer-readable storage medium of claim 12, wherein the processing device is a memory controller of a CXL device comprising one of a dynamic random access memory (DRAM), a synchronous dynamic random access memory (SDRAM), a ferroelectric random access memory (FeRAM), a magnetic random access memory (MRAM), and a resistive random access memory (RRAM).

17. The non-transitory computer-readable storage medium of claim 12, wherein the processing device is operatively coupled to the host processor, and an interface between the host processor and the processing device comprises a compute express link (CXL) or a communication link that allows cache line granularity updates and shares coherency control with the processing device.

* * * * *